United States Patent
Shi et al.

(10) Patent No.: US 11,375,502 B2
(45) Date of Patent: Jun. 28, 2022

(54) RESOURCE INDICATION METHOD AND DEVICE, STORAGE MEDIUM, AND PROCESSOR

(71) Applicant: XI'AN ZHONGXING NEW SOFTWARE CO., LTD., Shaanxi (CN)

(72) Inventors: Jing Shi, Shenzhen (CN); Shuqiang Xia, Shenzhen (CN); Xianghui Han, Shenzhen (CN); Min Ren, Shenzhen (CN); Wei Lin, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 112 days.

(21) Appl. No.: 16/764,570

(22) PCT Filed: Nov. 16, 2018

(86) PCT No.: PCT/CN2018/116047
§ 371 (c)(1),
(2) Date: May 15, 2020

(87) PCT Pub. No.: WO2019/096280
PCT Pub. Date: May 23, 2019

(65) Prior Publication Data
US 2020/0389895 A1    Dec. 10, 2020

(30) Foreign Application Priority Data
Nov. 17, 2017  (CN) .......................... 201711148877.5

(51) Int. Cl.
*H04W 72/04*    (2009.01)
*H04L 5/00*    (2006.01)

(52) U.S. Cl.
CPC ....... *H04W 72/0446* (2013.01); *H04L 5/0048* (2013.01); *H04L 5/0094* (2013.01)

(58) Field of Classification Search
CPC ............ H04W 72/0446; H04L 5/0048; H04L 5/0094
See application file for complete search history.

(56) References Cited

U.S. PATENT DOCUMENTS

2017/0188385 A1    6/2017    Abraham et al.
2017/0311337 A1    10/2017    Mo et al.
(Continued)

FOREIGN PATENT DOCUMENTS

| CN | 106888079 A | 6/2017 |
|---|---|---|
| WO | WO 2016-070742 | 5/2016 |
| WO | WO 2016-163848 | 10/2016 |

OTHER PUBLICATIONS

International Search Report of corresponding PCT Application No. PCT/CN2018/116047—4 pages (dated Jan. 30, 2019).
Huawei, "On Pre-Emption Indication for DL Multiplexing of URLLC and EMBB", 3GPP TSG RAN WG1 Meeting #90bis, R1-1717081—16 pages (Oct. 13, 2017).
(Continued)

*Primary Examiner* — Duc C Ho
(74) *Attorney, Agent, or Firm* — Knobbe, Martens, Olson & Bear, LLP

(57) ABSTRACT

Provided are a resource indication method and device. The method includes: configuring a reference resource for preemptive transmission, dividing the reference resource into M portions in a time domain, and dividing the reference source into N portions in a frequency domain; and indicating a preempted resource in the M time domain portions and/or N frequency domain portions through indication information, where M≥1, N≥1, and the number of downlink symbols comprised in the time domain of the reference resource
(Continued)

includes at least one of: a number less than 14 or a number greater than 14. Also disclosed are a computer storage medium and a processor.

20 Claims, 3 Drawing Sheets

(56) References Cited

U.S. PATENT DOCUMENTS

2020/0260474 A1* 8/2020 Shapin .............. H04W 72/0446
2021/0152312 A1* 5/2021 Xiong .................. H04L 5/0064

OTHER PUBLICATIONS

Zte, "On Pre-Emption Indication", 3GPP TSG-RAN WG1 Meeting 90bis, R1-1717043—10 pages (Oct. 13, 2017).
European Search Report in Application No. PCT/CN2018116047, dated Jul. 22, 2021 in 13 pages.
Office Action received in Indian Patent Application No. 202027025123, dated Aug. 17, 2021 in 6 pages.
Office Action received in Japanese Patent Application No. 2020526507, dated Jul. 30, 2021 in 18 pages.
Office Action received in Mexican Patent Application No. 2020005159, dated Jul. 29, 2020 in 5 pages.
Huawei, H, "On pre-emption indication for DL multiplexing of URLLC and EMBB" Discussion and Decision, Sep. 18-21, 2017.
Zte, S, "About DL Pre-emption indication" Discussion and Decision, Sep. 18-21, 2017.
European Search Report dated Nov. 24, 2021 for European Patent Application No. 18878452.4. 1 pages.
LG Electronics, "Remaining Issues on pre-emption indication for downlink", 3GPP TSG RAN WG1 meeting 90bis, Prague, CZ, Oct. 9-13, 2017. R1-1717970.
Qualcomm Incorporated, "URLLC DL pre-emption and UL suspension indication channel design", 3GPP TSG-RAN WG1 NR Ad-hoc #2, Jun. 27-30, 2017, Qingdao, P.R. China. R1-1711556.
Korean Office Action dated Oct. 14, 2021 for Korean Patent Application No. 10-2020-7017497. 11 pages.
Korean Office Action dated Apr. 11, 2022 for Korean Patent Application No. 10-2020-7017497.
3GPP TSG RAN WG1 Meeting NR#3, Nagoya, Japan, Sep. 18-21, 2017. R1-1715711. NEC. Discussion on DL pre-emption indication.

* cited by examiner

RESOURCE INDICATION METHOD AND DEVICE, STORAGE MEDIUM, AND PROCESSOR

CROSS-REFERENCES TO RELATED APPLICATIONS

This is a National Stage Application, filed under 35 U.S.C. 371, of International Patent Application No. PCT/CN2018/116047, filed on Nov. 16, 2018, which claims priority to a Chinese patent application No. 201711148877.5 filed on Nov. 17, 2017, disclosure of which is incorporated herein by reference in its entirety.

TECHNICAL FIELD

The present invention relates to communications and, specifically, to a resource indication method and device, a storage medium and a processor.

BACKGROUND

The 4th Generation mobile communication technology (4G) Long Term Evolution (LTE)/Long-Term Evolution Advance (LTE-Advance/LTE-A) and the 5th Generation mobile communication technology (5G) in the related art face increasing demands. From the current development trend, the 4G and 5G systems are studying how to support characteristics of mobile broadband enhancement, ultra-high reliability, ultra-low latency transmission and massive connection.

In the related art, in order to support the characteristics of ultra-high reliability and ultra-low latency transmission, a low-latency high-reliability traffic needs to be transmitted in a short transmission time, and meanwhile, in the transmission process of other traffics with a long transmission time, part of resource process transmission may be preempted. In order to reduce the performance influence on the traffic with long transmission time as much as possible, preempted resources need to be indicated to a reception side, and in this case, the reception side can remove error data when receiving and demodulating the traffic with longer transmission time such that the accumulation and spread of a large amount of retransmission data and error data are avoided and only the preempted resources are transmitted.

In the related art, for a scenario in which a configured downlink reference resource only contains fourteen symbol, a manner of dividing fourteen blocks by {M, N}={14, 1} or {7, 2} has been determined, where M denotes the number of blocks into which the downlink reference resource is divided in the time domain, N denotes the number of blocks into which the downlink reference resource is divided in the frequency domain, and 14 is obtained by multiplying these two numbers. The UE is informed of resource preemption information by indicating whether the fourteen blocks are preempted. However, for a scenario in which the downlink reference resource contains less than fourteen symbols or contains more than fourteen symbols, there is no better configuration method yet, so that a terminal cannot be indicated in time.

There is no effective solution to the above problem in the related art.

SUMMARY

Embodiments of the present invention provide a resource indication method and device, a computer storage medium and a processor, to at least solve the problem in the related art that a preemption resource cannot be effectively indicated when a traffic preempts resources for transmission.

According to one embodiment of the present invention, a resource indication method is provided. The method includes: configuring a reference resource for preemption transmission, dividing the reference resource into M portions in a time domain, and dividing the reference source into N portions in a frequency domain; and indicating a preempted resource in the M time domain portions and/or N frequency domain portions through indication information, where M≥1, N≥1, and the number of downlink symbols included in a time domain region of the reference resource includes at least one of: a number less than 14 or a number greater than 14. According to one embodiment of the present invention, a resource indication method is provided. The method includes: configuring a user equipment (UE) with a period for monitoring indication information of 1 mini-slot, where a reference resource is at least one of: a mini-slot, all fourteen symbols in one slot, in one slot and containing no uplink symbol, containing a mini-slot in which current indication information is located and previous continuous (U−1) mini-slots, a total of fourteen symbols, or not containing a mini-slot in which current indication information is located but containing adjacent previous continuous U mini-slots, a total of fourteen symbols, where U is a positive integer, where the indication information is used for indicating a preempted resource in M time domain portions and/or N frequency domain portions, where the M time domain portions are obtained by dividing the reference resource into M portions in a time domain, and the N frequency domain portions are obtained by dividing the reference resource into N portions in a frequency domain.

According to one embodiment of the present invention, a resource indication method is provided. The method includes: flushing a buffer after a user equipment (UE) receives indication information.

Where the flushing the buffer includes at least one of:

in response to receiving indication information and designated information, flushing the buffer according to a resource indicated by the indication information;

in response to receiving indication information and designated information are received, flushing the buffer according to an indication of the designated information;

in response to receiving indication information and designated information, in condition that the designated information indicates not to flush the buffer, flushing the buffer according to a resource indicated by preemption information (PI); and when the designated information indicates to flush the buffer, flushing the buffer according to an indication of the designated information; or in response to receiving indication information and designated information are received, in condition that the designated information indicates not to flush the buffer, not flushing the buffer; and in condition that the designated information indicates to flush the buffer, flushing the buffer according to a resource indicated by the indication information, where the designated information is used for indicating whether to flush the buffer on resources corresponding to all code block groups (CBGs), and the indication information is used for indicating a preempted resource in M time domain portions and/or N frequency domain portions, where the M time domain portions are obtained by dividing a reference resource into M portions in a time domain, and the N frequency domain portions are obtained by dividing the reference resource into N portions in a frequency domain.

According to another embodiment of the present invention, a resource indication device is provided. The device includes: a configuration module, which is configured to configure a reference resource for preemption transmission, divide the reference resource into M portions in a time domain, and divide the reference source into N portions in a frequency domain; and an indication module, which is configured to indicate a preempted resource in the M time domain portions and/or N frequency domain portions through indication information, where M≥1, N≥1, and the number of downlink symbols included in a time domain region of the reference resource includes at least one of: a number less than 14 or a number greater than 14.

According to yet another embodiment of the present disclosure, a storage medium is provided. The storage medium includes stored programs which, when executed, perform the method of any of the embodiments of the present invention.

According to another aspect of the embodiments of the present disclosure, a processor is provided. The processor is configured to execute programs which, when executed, perform the method of any of the embodiments of the present invention.

Through the embodiments of the present invention, by configuring a case in which the number of the downlink symbols included in the time domain region of the reference resource is not 14, the problem in the related art that the preemption resource cannot be effectively indicated when the traffic preempts resources for transmission is solved, and the traffic performance and the resource utilization rate of the traffic system are improved.

BRIEF DESCRIPTION OF DRAWINGS

The drawings described herein, which are included to provide a further understanding of the present invention and constitute a part of the present invention, illustrate embodiments of the present invention and together with the description serve to explain the present invention, and thus are not intended to limit the present invention. In the drawings.

DETAILED DESCRIPTION

The present invention will be described hereinafter in detail with reference to the drawings and in conjunction with embodiments.

It is to be noted that if not in collision, the embodiments and features therein the present application can be combined with each other.

It is to be noted that the terms "first", "second" and the like in the description, claims and drawings of the present invention are used to distinguish between similar objects and are not necessarily used to describe a particular order or sequence.

Embodiment One

Figure 1:
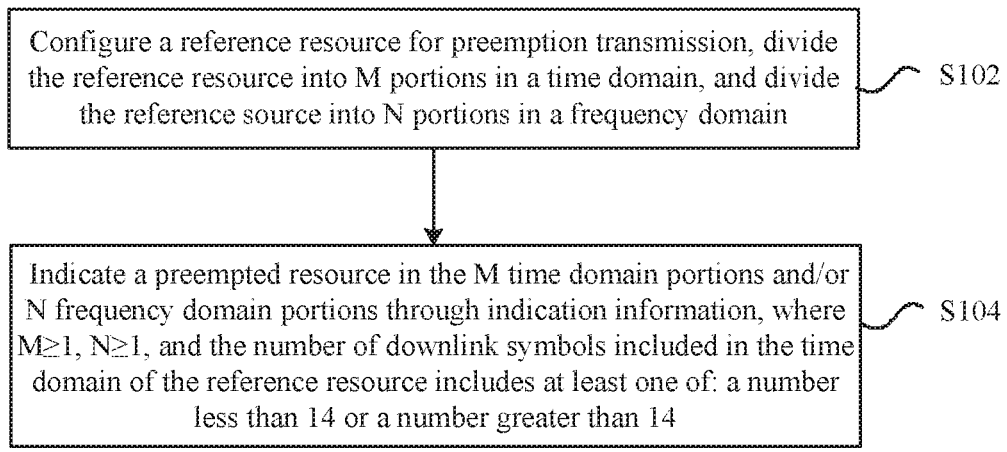
FIG. 1 is a flowchart of a resource indication method according to an embodiment of the present invention.

This embodiment provides a resource indication method. FIG. 1 is a flowchart of a resource indication method according to an embodiment of the present invention. As shown in FIG. 1, the method includes steps S102 and S104.

In step S102, a reference resource for preemption transmission is configured, the reference resource is divided into M portions in a time domain, and the reference source is divided into N portions in a frequency domain.

In step S104, a preempted resource is indicated in the M time domain portions and/or N frequency domain portions through indication information, where M≥1, N≥1, and the number of downlink symbols included in the time domain of the reference resource includes at least one of: a number less than 14 or a number greater than 14.

Through the above steps, by configuring a case in which the number of the downlink symbols included in the time domain region of the reference resource is not 14 (the condition in which the number of the downlink symbols is less than 14 and/or greater than 14), the problem in the related art that the preemption resource cannot be effectively indicated when the traffic preempts resources for transmission is solved, and the traffic performance and the resource utilization rate of the communication system are improved.

Optionally, the above steps may be executed by, but is not limited to, a network side, such as a base station.

In this embodiment, the reference resource may be, but is not limited to, a downlink reference resource, and may also be an uplink reference resource. This embodiment will be described below with the downlink reference resource as an example. It is to be noted that the reference resource corresponds to a time-frequency domain resource, that is, the reference resource is defied via the time domain resource and the frequency domain resource.

Optionally, the time domain region of the reference resource is at least one of: one slot and containing uplink symbols; one slot and containing no uplink symbol; or one mini-slot (or non-slot), where the number x of symbols included in the reference resource is greater than or equal to 1 and less than or equal to 13.

Optionally, the reference resource is divided by adopting at least one time domain granularity and at least one frequency domain granularity to obtain Y resource sub-blocks, where the divided resource sub-blocks do not contain the same resource size, and Y is a positive integer. Optionally, the reference resource is divided by using one time domain granularity and one frequency domain granularity to obtain less than or equal to Y resource sub-blocks, where the divided resource sub-blocks contain the same resource size, the one time domain granularity and the one frequency domain granularity are fixed values or indicated through signaling, and Y is a positive integer.

Optionally, the reference resource is divided by adopting the one time domain granularity and the one frequency domain granularity in at least one of following manners: dividing the reference resource by selecting different candidate granularity sets according to whether the number of symbols included in the reference resources is an even number or an odd number; dividing the reference resource by selecting different candidate granularity sets according to whether the number of symbols included in the reference resources is greater than 7; dividing the reference resource by selecting different candidate granularity sets according to whether the number of symbols included in the reference resource is an even number or an odd number and whether the number of symbols included in the reference resource is greater than 7; or dividing fourteen symbols of the reference resource containing uplink symbols, and when resources in a divided resource sub-block are completely uplink resources, indicating that bits of the resource sub-block are not used or reserved. Optionally, the candidate granularity set includes at least one of: {1 OS, 1 BW}, {2 OS, ½ BW} or {1 OS, ½ BW}.

Optionally, different candidate granularities are determined to be used to divide the reference resource to obtain resource sub-blocks according to whether the number x of symbols included in the reference resource is greater than P, where P is a positive integer.

Optionally, when 0<x≤7, the x symbols are divided by using a granularity {1 OS, ½ BW} to obtain less than or equal to Y resource sub-blocks, where the divided resource sub-blocks contain the same resource size; and when 7<x≤14, (14−x) symbols are divided by using a granularity {1 OS, ½ BW} and (2x−14) symbols are divided by using a granularity {1 OS, 1 BW} to obtain Y resource sub-blocks, where the divided resource sub-blocks do not contain the same resource size, and Y is a positive integer.

Optionally, the time domain region of the reference resource is at least one of: two slots and containing uplink symbols; or two slots and containing no uplink symbol.

Optionally, the division manner of the reference resource includes at least one of: having no uplink symbol in the slots, and when the divided resource sub-blocks are allowed to cross a slot boundary, dividing the reference resource by configuring {M, N}={14, 1} or {7, 2} to obtain 14 resource sub-blocks, where division granularities corresponding to {M, N}={14, 1} and {M, N}={7, 2} are {2 OS, 1 BW} and {4 OS, ½ BW} respectively; having no uplink symbol in the slots, and when the divided resource sub-blocks are not allowed to cross the slot boundary, dividing the reference resource with a granularity {2 OS, 1 BW} by configuring {M, N}={14, 1} to obtain 14 resource sub-blocks; or having no uplink symbol in the slots, and when the divided resource sub-blocks are not allowed to cross the slot boundary, dividing the reference resource by configuring {M, N}={14, 1} and {7, 2} to obtain 14 resource sub-blocks, wherein {M, N}={7, 2} divides different numbers of resource sub-blocks in two slots respectively.

Optionally, the division manner of the reference resource includes at least one of: in condition that the uplink symbols are comprised in the slots and the two slots have a same format, dividing the reference resource into Y resource sub-blocks, each of the two slots contains 7 resource sub-blocks;

in condition that the uplink symbols are comprised in the slots and formats of the two slots are the same, dividing the reference resource into Y resource sub-blocks wherein a number of resource sub-blocks included in each slot is different but the difference is not more than 2;

in condition that the uplink symbols are comprised in the slots and the two slots have a same format, dividing, by the two slots, the reference resource according to division granularities {1 OS, 1 BW} and/or {2 OS, 1 BW} to obtain less than or equal to Y resource sub-blocks; or in condition that the uplink symbols are comprised in the slots and the two slots have a same format, dividing the reference resource comprising 28 symbols of the two slots containing uplink symbols to obtain Y resource sub-blocks, and when resources in a divided resource sub-block are completely uplink resources, indicating that bits of the resource sub-block are not used or reserved.

Optionally, the division manner of the reference resource includes at least one of: in condition that the uplink symbols are comprised in the slots and formats of the two slots are different, allocating numbers of resource sub-blocks included in the two slots according to a ratio of N1 to N2 by using at least one time-frequency domain division granularity in one of the reference resources to obtain Y resource sub-blocks;

in condition that the uplink symbols are comprised in the slots and formats of the two slots are different, when one of the reference resources is divided into resource sub-blocks, allocating numbers of resource sub-blocks in respective slots according to a ratio of N1 to N2 by using only one time-frequency domain granularity to obtain less than or equal to Y resource sub-blocks; or in condition that the uplink symbols are comprised in the slots and the two slots have a same format, dividing 28 symbols of the two slots containing uplink symbols into Y resource sub-blocks, and when resources in a resource sub-block are completely uplink resources, indicating that bits of the resource sub-block are not used or reserved;

where the reference resource has N1 and N2 symbols in the two slots respectively, and Y is a positive integer.

Optionally, the time domain region of the reference resource is at least one of: more than two slots and containing uplink symbols; or more than two slots and containing no uplink symbol. Optionally, the division manner of the reference resource includes: dividing the reference resource into less than or equal to Y resource sub-blocks, where Y is a positive integer.

Optionally, the method further includes: when the resource sub-blocks are less than 14, indicating that bits of remaining resource sub-blocks are not used or reserved; when the number of resource sub-blocks is less than or equal to 14; or when resources in a resource sub-block are completely uplink resources, indicating that bits of the resource sub-block are not used or reserved In the above solution, Y is equal to 14.

Optionally, the method further includes: determining a first monitoring period of the preemption indication information; and determining the time domain region of the reference resource to be a time domain region of the first monitoring period.

Optionally, the first monitoring period of the preemption indication information is determining in one of following manners: being configured via high layer signaling or physical layer signaling, and where the first monitoring period is not related to a second monitoring period bearing slot format information (SFI); being configured via high layer signaling or physical layer signaling, where the first monitoring period is less than or equal to a second monitoring period; or being configured via high layer signaling or physical layer signaling, where the first monitoring period is a sub-set of the second monitoring period.

This embodiment further provides another resource indication method. The method includes the following step.

A UE is configured with a period for monitoring indication information of 1 mini-slot, where a reference resource is at least one of:

one mini-slot;

all fourteen symbols in one slot;

in one slot and containing no uplink symbol;

including a mini-slot in which current indication information is located and previous continuous (U−1) mini-slots, a total of fourteen symbols; or excluding a mini-slot in which current indication information is located but including adjacent previous continuous U mini-slots, a total of fourteen symbols, where U is a positive integer, where the indication information is used for indicating a preempted resource in M time domain portions and/or N frequency domain portions, where the M time domain portions are obtained by dividing the reference resource into M portions in a time domain, and the N frequency domain portions are obtained by dividing the reference resource into N portions in a frequency domain.

This embodiment further provides yet another resource indication method. The method includes the following step.

After a UE receives indication information, a buffer is flushed.

The buffer is flushed in at least one of following manners:

in response to receiving indication information and designated information, flushing the buffer according to a resource indicated by the indication information;

in response to receiving indication information and designated information, flushing the buffer according to an indication of the designated information;

in response to receiving indication information and designated information, in condition that the designated information indicates not to flush the buffer, flushing the buffer according to a resource indicated by preemption information (PI); and in condition that the designated information indicates to flush the buffer, flushing the buffer according to an indication of the designated information; or in response to receiving indication information and designated information, in condition that the designated information indicates not to flush the buffer, not flushing the buffer; and in condition that the designated information indicates to flush the buffer, flushing the buffer according to a resource indicated by the indication information, where the designated information is used for indicating whether to flush the buffer on resources corresponding to all code block groups (CBGs), and the indication information is used for indicating a preempted resource in M time domain portions and/or N frequency domain portions, where the M time domain portions are obtained by dividing a reference resource into M portions in a time domain, and the N frequency domain portions are obtained by dividing the reference resource into N portions in a frequency domain.

Through the description of the preceding embodiments, it will be apparent to those skilled in the art that the method in the embodiments described above may be implemented by software plus a necessary general-purpose hardware platform, or may of course be implemented by hardware. However, in many cases, the former is a preferred implementation mode. Based on this understanding, the technical solution of the present invention substantially, or the part contributing to the related art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to execute the method according to each embodiment of the present invention.

Embodiment Two

This embodiment further provides a resource indication device. The device is configured to implement the above embodiments and exemplary embodiments. What has been described will not be repeated. As used below, the term "module" may be software and/or hardware capable of implementing predetermined functions. The device described in the following embodiment is preferably implemented by software, but implementation by hardware or a combination of software and hardware is also possible and conceived.

Figure 2:
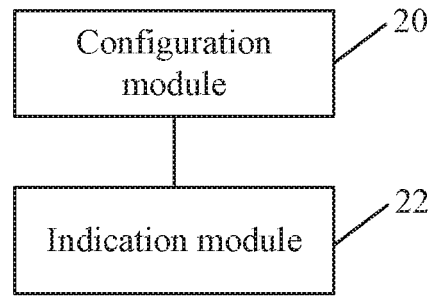
FIG. 2 is a structural diagram of a resource indication device according to an embodiment of the present invention.

FIG. 2 is a structural diagram of a resource indication device according to an embodiment of the present invention. As shown in FIG. 2, the device includes a configuration module 20 and an indication module 22.

The configuration module 20 is configured to configure a reference resource for preemption transmission, divide the reference resource into M portions in a time domain, and divide the reference source into N portions in a frequency domain.

The indication module 22 is configured to indicate a preempted resource in the M time domain portions and/or N frequency domain portions through indication information, where M≥1, N≥1, and the number of downlink symbols included in a time domain region of the reference resource includes at least one of: a number less than 14 or a number greater than 14.

It is to be noted that the various modules described above may be implemented by software or hardware. Implementation by hardware may, but may not necessarily, be performed in the following manners: the various modules described above are located in the same processor, or the various modules described above are located in different processors in any combination form.

Embodiment Three

This embodiment is an optional embodiment of the present application, and is used for describing the present application in detail in conjunction with implementation modes.

When a time domain region corresponding to a downlink reference resource region is one slot and including uplink symbols, or when the time domain region corresponding to the downlink reference resource region is a number of orthogonal frequency division multiplexing (OFDM) symbols, the division manner of the resource sub-blocks includes at least one of: a manner 1 and a manner 2.

In the manner 1, the reference resource is still divided into 14 resource sub-blocks.

Specifically, the manner 1 is: when division is performed in one downlink reference resource region, adopting at least one time domain granularity and at least one frequency domain granularity. The divided resource sub-blocks do not contain the same resource size.

In the manner 2, the reference resource is divided into less than or equal to 14 resource sub-blocks. Specifically, the manner 2 is: when division is performed in one downlink reference resource region, adopting one time domain granularity and one frequency domain granularity. The divided resource sub-blocks contain the same resource size. The manner 2 further includes at least one of: a manner 2-1, a manner 2-2, a manner 2-3 or a manner 2-4.

In the manner 2-1, different candidate granularity sets are selected for division of resource sub-blocks according to whether the number of symbols included in the downlink reference resource is an even number or an odd number.

In the manner 2-2, different candidate granularity sets are selected for division of resource sub-blocks according to whether the number of symbols included in the downlink reference resource is greater than 7.

In the manner 2-3, different candidate granularity sets are first selected for division of resource sub-blocks according to whether the number of symbols included in the downlink reference resource is an even number or an odd number, and then when the number of symbols included in the downlink reference resource is an odd number, different candidate granularity sets are selected for division of resource sub-blocks according to whether the number of symbols included in the downlink reference resource is greater than 7.

In the manner 2-4, a total of fourteen symbols including uplink symbols are divided into 14 resource sub-blocks by {M, N}={14, 1} or {7, 2}, and when resources in a divided resource sub-block are completely uplink resources, it is indicated that bits of the resource sub-block are not used or reserved.

When the time domain region corresponding to the downlink reference resource region is two slots, and the division manner of the resource sub-blocks includes at least one of: a manner one, a manner two or a manner three.

In the manner one, no uplink symbol exists in the slots, and when the divided resource sub-blocks are allowed to cross a slot boundary, 14 resource sub-blocks may be obtained after division by {M, N}={14, 1} or {7, 2}, and in this case, division granularities used respectively are {2 OS, 1 BW} or {4 OS, ½ BW}; or when the divided resource sub-blocks are not allowed to cross the slot boundary, only {M, N}={14, 1} is configured, that is, the division granularity {2 OS, 1 BW} is used, or {M, N}={14, 1} and {7, 2} are configured, where {M, N}={7, 2} divides different numbers of resource sub-blocks in two slots respectively.

In the manner two, uplink symbols are included in the slots, and two slots have a same format.

The downlink reference resource has N symbols in each slot. In this case, when the downlink reference resource is divided into resource sub-blocks, one of following manners may be used: a manner 1, a manner 2, a manner 3 or a manner 4. In the manner 1, the downlink reference resource is divided into 14 resource sub-blocks, each of which contains 7 resource sub-blocks.

In the manner 2, the downlink reference resource is divided into 14 resource sub-blocks, where a difference of numbers of resource sub-blocks included in each slot is not more than 2. In the manner 3, the downlink reference resource is divided into less than or equal to 14 resource sub-blocks, two slots are divided only according to granularities {1 OS, 1 BW} and/or {2 OS, 1 BW}, and when there are less than 14 resource sub-blocks, a remaining preemption indication (PI) indicates that bits are reserved and not used. In the manner 4, a total of 28 symbols of two slots including uplink symbols are divided into 14 resource sub-blocks by {M, N}={14, 1} or {7, 2}, and when resources in a resource sub-block are completely uplink resources, it is indicated that bits of the resource sub-block are not used or just reserved. In this case, the division manner is the same as manners in the manner one.

In the manner 3, uplink symbols are included in the slots, and formats of two slots are different. The downlink reference resource has N1 and N2 symbols in the two slots respectively. In this case, when the downlink reference resource is divided into resource sub-blocks, one of following manners may be used: a manner 1, a manner 2 or a manner 3. In the manner 1, the downlink reference resource is divided into 14 resource sub-blocks. Numbers of resource sub-blocks included in the two slots are allocated according to a ratio of N1 to N2. When one downlink reference resource is divided into resource sub-blocks, at least one time-frequency domain granularity is used. In the manner 2, the downlink reference resource is divided into less than or equal to 14 resource sub-blocks, that is, the number of sub-blocks in a respective one of two slots is divided according to the ratio of N1 to N2, and a sum of these two numbers is not more than 14. When one downlink reference resource is divided into resource sub-blocks, only one time-frequency domain granularity is used. In the manner 3, a total of 28 symbols of two slots including uplink symbols are divided into 14 resource sub-blocks by {M, N}={14, 1} or {7, 2}, and when resources in a resource sub-block are completely uplink resources, it is indicated that bits of the resource sub-block are not used or just reserved. In this case, the division manner is the same as manners in the manner one.

When the time domain region corresponding to the downlink reference resource region is more than two slots, and a principle of the division of resource sub-blocks is that the number of divided resource sub-blocks are not greater than 14. When the number of resource sub-blocks is less than 14, the remaining indicates that bits are not used or just reserved. In this case, the downlink reference resource is divided by a larger granularity.

This embodiment further includes multiple implementation modes described below.

Implementation Mode One

Resources used by a base station to transmit an ultra-high-reliability ultra-low-latency communications (URLLC) traffic with a short transmission duration are resources which are preempted from resources already allocated to an enhanced mobile broadband (eMBB) traffic. A terminal whose resources are preempted is notified which resources in a configured downlink reference resource region are preempted via preemption indication information.

A frequency domain region corresponding to the downlink reference resource region is an activation downlink (DL) bandwidth part (BWP) of the terminal, a corresponding time domain region may be configured, which may be an integer multiple of slots or may be several OFDM symbols.

When the time domain region corresponding to the DL reference resource region is one slot, M time domain portions and N frequency domain portions may be obtained through division, and candidate {M, N} is {14, 1} or {7, 2}, one of which is configured via high layer signaling.

Figure 3:
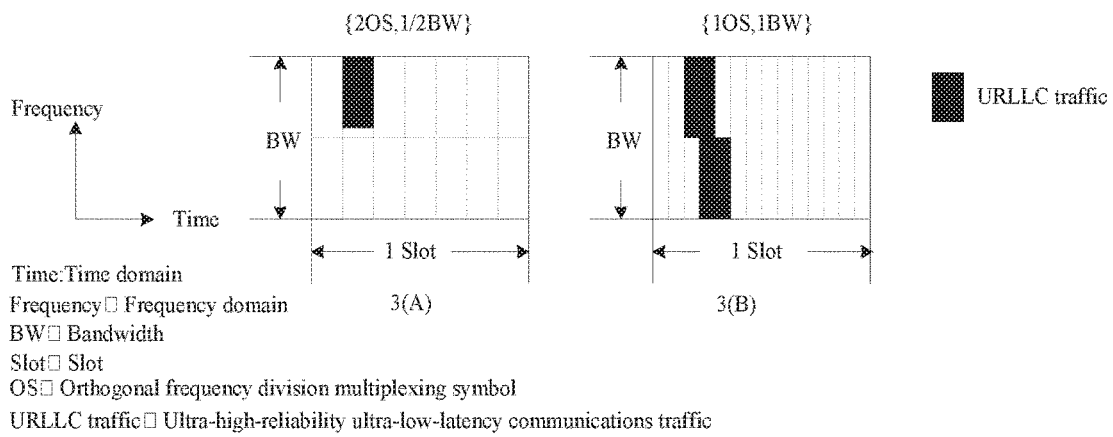
FIG. 3 is a schematic diagram of preemption transmission according to an implementation mode.

When 14 OFDM symbols of one slot all are DL symbols or DL symbols and unknown symbols, in this case, the DL reference resource region is 14 OFDM symbols in the time domain, 14 resource sub-blocks may be obtained after division by {M, N}={14, 1} or {7, 2}, and whether a resource sub-block is preempted is indicated via one bit. FIG. 3 is a schematic diagram of preemption transmission of this implementation mode, including two parts: 3(A) and 3(B). As shown in 3(A) of FIG. 3, the DL reference resource is divided according to {M, N}={14, 1} with a division granularity of {2 OS, ½ BW}, and a fourth (assuming that the 14 resource sub-blocks are numbered according to an order that resource sub-blocks in the frequency domain are numbered first and ones in the time domain are second) in the 14 resource sub-blocks is preempted, which is indicated as 00010000000000. As shown in 3(B) of FIG. 3, the downlink reference resource is divided according to {M, N}={14, 1} with a division granularity of {1 OS, 1 BW}, and a third, fourth and fifth (assuming that the 14 resource sub-blocks are numbered according to an order that resource sub-blocks in the frequency domain are numbered first and ones in the time domain are second) in the 14 resource sub-blocks is preempted, which is indicated as 00111000000000. It is assumed that '0' denotes that the resource sub-block is not preempted, and '1' denotes that the resource sub-block is preempted. It is noted that OS in the division granularity of {2 OS, ½ BW} denotes the OFDM symbol, BW denotes the bandwidth, and in this case BW is preferably the activation DL BWP. When uplink OFDM symbols exist among 14 OFDM symbols of one slot, in this case, the DL reference resource region has less than 14 OFDM symbols in the time domain, and since the minimum time domain granularity is one OFDM symbol during division of resource sub-blocks, there is a case in which 14 resource sub-blocks cannot be obtained after division by {M, N}={14, 1} or {7, 2} when the number of OFDM symbols is less than 14. Therefore, when the DL reference resource region has less than 14 OFDM symbols, the manner for dividing resource sub-blocks is as follows. Note that the following manner is also applicable to the scenario in which time domain of the DL reference resource region is configured to be the mini-slot or several OFDM symbols.

In a solution manner 1, the DL reference resource is still divided into 14 resource sub-blocks. Specifically, the manner 1 is: when division is performed in one downlink reference resource region, adopting at least one time domain granularity and at least one frequency domain granularity. The divided resource sub-blocks do not contain the same resource size.

Figure 4:
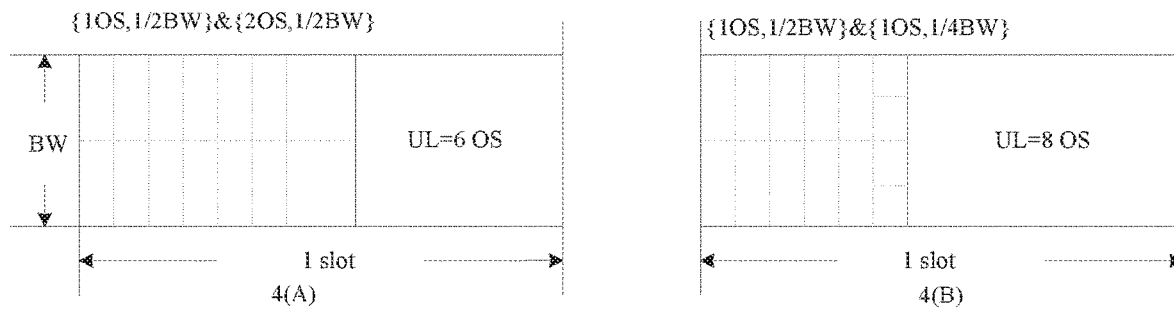
FIG. 4 is a schematic diagram showing a resource sub-block division when symbols are less than 14 according to an implementation mode.

For example, FIG. 4 is a schematic diagram showing a resource sub-block division when symbols are less than 14 in this implementation mode, including 4(A) and 4(B). As shown in 4(A) in FIG. 4, when the DL reference resource region contains 8 symbols, the downlink reference resource is divided into 14 resource sub-blocks according to granularities {1 OS, ½ BW} and {2 OS, ½ BW}. In this case, M=7, and N=2, that is, when the DL reference resource is divided into resource sub-blocks, two time domain granularities and one frequency domain granularity are used.

For example, as shown in 4(B) in FIG. 4, when the DL reference resource region contains 6 symbols, the DL reference resource is divided into 14 resource sub-blocks according to granularities {1 OS, ½ BW} and {1 OS, ¼ BW}. In this case, M=7, and N=2 or 4, that is, when the DL reference resource is divided into resource sub-blocks, one time domain granularity and two frequency domain granularities are used.

In a solution manner 2, the DL reference resource is divided into less than or equal to 14 resource sub-blocks. Specifically, the solution manner 2 is: when division is performed in one downlink reference resource region, adopting one time domain granularity and one frequency domain granularity. The divided resource sub-blocks contain the same resource size.

In a manner 2-1, different candidate granularity sets are selected for division of resource sub-blocks according to whether the number of symbols included in the downlink reference resource is an even number or an odd number. In this case, when the DL reference resource contains an even number of symbols in the time domain, the DL reference resource is divided into resource sub-blocks by using one of granularities: {1 OS, 1 BW} or {2 OS, ½ BW}; when the DL reference resource contains an odd number of symbols in the time domain, only {1 OS, 1 BW} is configured.

For example, when the DL reference resource contains 8 symbols, the DL reference resource is divided into resource sub-blocks by using one of the granularities: {1 OS, 1 BW} or {2 OS, ½ BW} to obtain 8 resource sub-blocks, and in this case, {M, N} is equal to one of: {8, 1} or {4, 2}. In this case, 8 bits are used to indicate whether a resource sub-block is preempted, and remaining unused bits are reserved. Assuming that a preemption indication (PI) fixedly uses 14 bits, in this case, remaining 6 bits are reserved.

For example, when the DL reference resource contains 7 resource sub-blocks, the DL reference resource is divided by using the granularity of {1 OS, 1 BW}, and in this case, {M, N}={7, 1}. In this case, 7 bits are used to indicate whether a resource sub-block is preempted, and remaining unused bits are reserved. Assuming that a preemption indication (PI) fixedly uses 14 bits, in this case, remaining 7 bits are reserved.

In a manner 2-2, different candidate granularity sets are selected for division of resource sub-blocks according to whether the number of symbols included in the DL reference resource is greater than 7.

In this case, when the downlink reference resource contains x symbols in the time domain, when 0<x≤7, {1 OS, 1 BW} or {1 OS, ½ BW} is used to divide the DL reference resource; when 7<x≤14, {1 OS, 1 BW} is used to divide the DL reference resource.

For example, when the DL reference resource contains 8 symbols, the DL reference resource is divided into resource sub-blocks by using {1 OS, 1 BW} to obtain 8 resource sub-blocks, and in this case, {M, N}={8, 1}. In this case, 8 bits are used to indicate whether a resource sub-block is preempted, and remaining unused bits are reserved. Assuming that a PI fixedly uses 14 bits, in this case, remaining 6 bits are reserved.

In another example, when the DL reference resource contains 5 resource sub-blocks, the DL reference resource is divided by using one of granularities: {1 OS, 1 BW} or {1 OS, ½ BW}, and in this case, {M, N} is equal to one of: {5, 1} or {10, 1}. In this case, 5 or 10 bits are used to indicate whether a resource sub-block is preempted, and remaining unused bits are reserved. Assuming that a PI fixedly uses 14 bits, in this case, remaining 9 or 4 bits are reserved.

In a manner 2-3, different candidate granularity sets are first selected for division of resource sub-blocks according to whether the number of symbols included in the DL reference resource is an even number or an odd number, and then when the number of symbols included in the DL reference resource is an odd number, different candidate granularity sets are selected for division of resource sub-blocks according to whether the number of symbols included in the DL reference resource is greater than 7. In this case, when the DL reference resource contains an even number of symbols in the time domain, the DL reference resource is divided into resource sub-blocks by using one of granularities: {1 OS, 1 BW} or {2 OS, ½ BW}; when the DL reference resource contains an odd number of symbols in the time domain, when 0<x≤7, the DL reference resource is divided by using {1 OS, 1 BW} and {1 OS, ½ BW}, and when 7<x≤14, the DL reference resource is divided by using {1 OS, 1 BW}.

For example, when the DL reference resource contains 8 symbols, the DL reference resource is divided into resource sub-blocks by using one of the granularities: {1 OS, 1 BW} or {2 OS, ½ BW} to obtain 8 resource sub-blocks, and in this case, {M, N} is equal to one of: {8, 1} or {4, 2}. In this case, 8 bits are used to indicate whether a resource sub-block is preempted, and remaining unused bits are reserved.

Assuming that a PI fixedly uses 14 bits, in this case, remaining 6 bits are reserved.

For example, when the DL reference resource contains 9 resource sub-blocks, the DL reference resource is divided by using the granularity of {1 OS, 1 BW}, and in this case, {M, N}={9, 1}. In this case, 9 bits are used to indicate whether a resource sub-block is preempted, and remaining unused bits are reserved. Assuming that a PI fixedly uses 14 bits, in this case, remaining 5 bits are reserved.

In another example, when the DL reference resource contains 5 resource sub-blocks, the DL reference resource is divided by using one of granularities: {1 OS, 1 BW} or {1 OS, ½ BW}, and in this case, {M, N} is equal to one of: {5, 1} or {10, 1}. In this case, 5 or 10 bits are used to indicate whether a resource sub-block is preempted, and remaining unused bits are reserved. Assuming that a PI fixedly uses 14 bits, in this case, remaining 9 or 4 bits are reserved.

Figure 5:
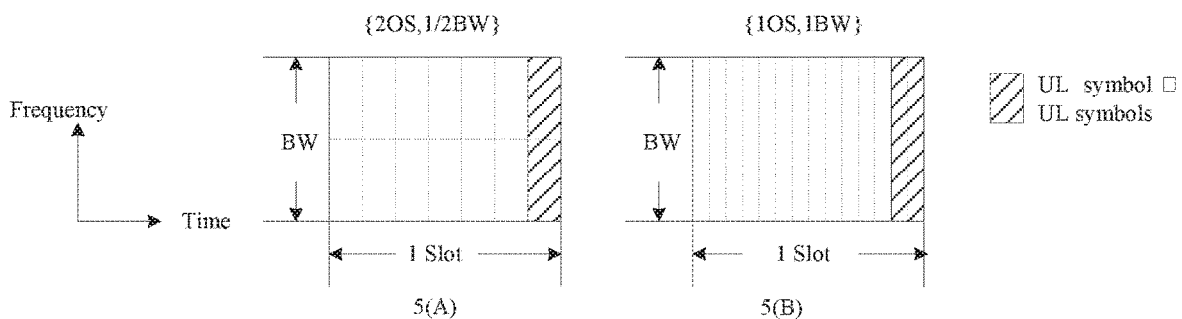
FIG. 5 is a schematic diagram showing a resource sub-block division according to an implementation mode.

In a manner 2-4, a total of fourteen symbols including uplink symbols are divided into 14 resource sub-blocks by {M, N}={14, 1} or {7, 2}, and when resources in a divided resource sub-block are completely uplink resources, it is indicated that bits of the resource sub-block are not used or reserved. FIG. 5 is a schematic diagram showing a resource sub-block division in this implementation mode, including 5(A) and 5(B). As shown in FIG. 5, a total number of uplink symbols in the slot is 2. In this case, the DL reference resource is divided into 14 resource sub-blocks by {M, N}={7, 2} as shown in 5(A), and two resource sub-blocks corresponding to last two symbols do not need to be indicated; or in this case, the downlink reference resource is divided into 14 resource sub-blocks by {M, N}={14, 1} as shown in 5(B), and two resource sub-blocks corresponding to last two symbols do not need to be indicated.

In a solution manner 3, different candidate granularity sets are selected for division of resource sub-blocks according to whether the number of symbols included in the DL reference resource is greater than 7. In this case, when the DL reference resource contains x symbols, there are two preferable cases.

Preferably, when $0<x\leq 7$, the DL reference resource is divided into less than 14 resource sub-blocks by using a granularity {1 OS, ½ BW}; when $7<x\leq 14$, the DL reference resource is divided into 14 resource sub-blocks by using a granularity {1 OS, 1 BW} or {1 OS, ½ BW}. Preferably, when $0<x\leq 7$, the DL reference resource is divided into less than or equal to 14 resource sub-blocks by using a granularity {1 OS, ½ BW}; when $7<x\leq 14$, the DL reference resource is divided into 14 resource sub-blocks by using a granularity {1 OS, 1 BW} or {1 OS, ½ BW}.

For example, when the DL reference resource contains 13 symbols, when the DL reference resource is divided into resource sub-blocks, one symbol (preferably the first symbol among the 13 symbols) uses a granularity {1 OS, ½ BW} and other symbols use a granularity {1 OS, 1 BW} to obtain 14 resource sub-blocks. In this case, M=13, and N=1 or 2. In other words, when the DL reference resource is divided into resource sub-blocks, one time domain granularity and two frequency domain granularities are used. In this case, 14 bits are used to indicate whether a resource sub-block is preempted.

For example, when the DL reference resource includes twelve symbols, when the DL reference resource is divided into resource sub-blocks, two symbols (preferably first two symbols among the 13 symbols) use a granularity {1 OS, ½ BW} and other symbols use a granularity {1 OS, 1 BW} to obtain 14 resource sub-blocks. In this case, M=12, and N=1 or 2. In other words, when the DL reference resource is divided into resource sub-blocks, one time domain granularity and two frequency domain granularities are used. In this case, 14 bits are used to indicate whether a resource sub-block is preempted.

For example, when the DL reference resource contains 5 symbols, when the DL reference resource is divided into resource sub-blocks, a granularity {1 OS, ½ BW} is used to obtain 10 resource sub-blocks. In this case, M=5, and N=2. In this case, 10 bits are used to indicate whether a resource sub-block is preempted, and remaining unused bits are reserved. Assuming that a PI fixedly uses 14 bits, in this case, remaining 4 bits are reserved.

When $0<x\leq 7$, the x symbols are divided by using a granularity (preferably {1 OS, ½ BW}) to obtain less than or equal to 14 resource sub-blocks, where the divided resource sub-blocks contain the same resource size; and when $7<x\leq 14$, (14−x) symbols are divided by using a granularity (preferably {1 OS, ½ BW}) and (2x−14) symbols are divided by using another granularity (preferably {1 OS, 1 BW}) to obtain Y resource sub-blocks. Alternatively, when $0<x\leq 7$, the x symbols are divided by using a granularity (preferably {1 OS, ½ BW}) to obtain less than or equal to 14 resource sub-blocks, where the divided resource sub-blocks contain the same resource size; and when $7<x\leq 14$, (14−x) symbols are divided by using a granularity (preferably {1 OS, ½ BW}) and (2x−14) symbols are divided by using another granularity (preferably {1 OS, 1 BW}) to obtain Y resource sub-blocks, where the divided resource sub-blocks do not contain the same resource size.

Solution Manner 4

This manner is applicable to the scenario in which the time domain of the DL reference resource region is configured to be a mini-slot or non-slot level granularity or a several-OFDM symbol level granularity, but it is not limited herein.

Assuming that the number of symbols included in the mini-slot or non-slot or in several OFDM symbols is x, the value of x may be an integer from 1 to 13. This manner will be described with x=2 as an example, but manners when x takes other values are similar to this manner, which will not be repeated herein.

A UE is configured with a period for monitoring preemption indication information of one mini-slot, that is, x=2 OFDM symbols. In this case, the DL reference resource region corresponding to preempted resources indicated by the preemption indication information is still 14 OFDM symbols.

In a manner 4-1, these fourteen symbols are in one slot. In this case, the DL reference resource is still divided into 14 resource sub-blocks according to {M, N}={14, 1} or {7, 2}. Preferably, when resources in a resource sub-block are completely uplink resources, it is indicated that bits of the resource sub-block are not used or reserved. The manner is characterized in that all pieces of preemption indication information received in one slot are the same and all are preempted resource indications in all non-slots in the previous one slot, and the reliability of the preemption indication information can be improved by receiving the same preemption indication information for multiple times.

In a manner 4-2, these 14 symbols are a total of 14 symbols which include symbols in a non-slot in which the current PI is located and symbols in previous 6 non-slots, or these 14 symbols are a total of 14 symbols which do not include symbols in the non-slot in which the current PI is located but include symbols in adjacent previous 7 non-slots, where each non-slot includes x=2 symbols. In this case, the DL reference resource is still divided into 14 resource sub-blocks according to {M, N}={14, 1} or {7, 2}. Preferably, when resources in a resource sub-block are completely uplink resources, it is indicated that bits of the resource sub-block are not used or reserved. The manner is characterized in that the preemption indication information received in each non-slot is the most timely, and is the preempted resource indications which contain the current non-slot and the previous 6 non-slots or is the preempted resource indications which do not contain the current non-slot but contain the previous 7 non-slots. At the same time, the preemption indication information received later can check whether part of indication information in the preemption indication information received earlier is correct.

Alternatively, the UE is configured with a period for monitoring preemption indication information of one non-slot, that is, x=2 OFDM symbols. In this case, the DL reference resource region corresponding to preempted resources indicated by the preemption indication information is two OFDM symbols.

In a 4-3 manner, the two OFDM symbols are divided by using a granularity of one symbol in the time domain and a granularity of 1/7 bandwidth in the frequency domain to obtain 14 resource sub-blocks. Whether a resource sub-block is preempted is indicated through a 14-bit bitmap.

In a 4-4 manner, the two OFDM symbols are divided by using a granularity of one symbol in the time domain and a granularity of ½ bandwidth in the frequency domain to obtain 4 resource sub-blocks. Whether a resource sub-block is preempted is indicated through a 14-bit bitmap, where 10 bits are reserved or not used.

In a 4-5 manner, the two OFDM symbols are divided by using a granularity of one symbol in the time domain and a granularity of 1/P bandwidth in the frequency domain to obtain 2P resource sub-blocks. Whether a resource sub-block is preempted is indicated through a 14-bit bitmap, where (14−2P) bits are reserved or not used. The value of P is at least one of values in a set {1, 2, 3, 4, 5, 6, 7}.

Furthermore, remaining bits may not be used, or may be used for further indicating resources divided into more frequency-domain portions are preempted. Assuming that the number of remaining bits is x, only partial bits may be used for indicating a particular frequency domain portion. For example, for 1 BW, only 2, 4 or 8 bits in remaining bits are used for indicating whether frequency domain resources of ½, ¼ or ⅛ granularity are preempted; for ½ BW, only 4 or 8 bits in the remaining bits are used for indicating whether frequency domain resources of ¼ or ⅛ granularity are preempted. All x bits can also be used for indicating the divided frequency domain portions. For example, for 1 BW, x bits are used for indicating whether frequency domain resources of 1/x granularity are preempted.

Through the resource indication method in this implementation mode, resource indication applicable to a case in which the number of symbols of the DL reference resource is less than 14 under the condition of fixed indication overhead, so that data of preempted transmission can know a position of the preemption resource, the accumulation and spread of a large amount of retransmission data and error data are avoided, only the preempted resource is transmitted, and the spectrum efficiency of the system is improved.

Implementation Mode Two

Resources used by a base station to transmit a URLLC traffic with a short transmission duration are resources which are preempted from resources already allocated to an eMBB traffic. A terminal whose resources are preempted is notified which resources in a configured DL reference resource region are preempted via preemption indication information.

A frequency domain region corresponding to the DL reference resource region is an activation DL BWP of the terminal, and a corresponding time domain region may be configured, which may be an integer multiple of slots or may be several OFDM symbols.

The time domain region corresponding to the DL reference resource region of this implementation mode is two slots.

In a scenario one, when 14 OFDM symbols of each slot all are DL symbols or DL symbols and unknown symbols, in this case, the DL reference resource region has 28 OFDM symbols in the time domain, 14 resource sub-blocks may be obtained after division by {M, N}={14, 1} or {7, 2}, the division granularity used in this case is {2 OS, 1 BW} or {4 OS, ½ BW} respectively, and whether a resource sub-block is preempted is indicated via one bit. Note that in this case, the divided resource sub-blocks are allowed to cross a slot boundary.

When the divided resource sub-blocks are not allowed to cross a slot boundary, one of following manners may be adopted: a manner 1 or a manner 2.

In the manner 1, only {M, N}={14, 1} is configured, that is, a division granularity {2 OS, 1 BW} is adopted.

In the manner 2, {M, N}={14, 1} and {7, 2} are configured, where {M, N}={7, 2} divides different numbers of resource sub-blocks in two slots respectively.

Figure 6:
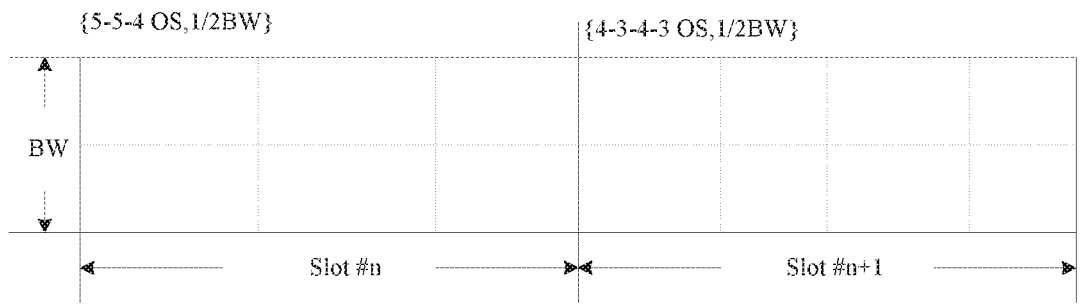
FIG. 6 is a schematic diagram one showing a resource sub-block division when a downlink reference resource is 2 slots according to an implementation mode.

For example, FIG. 6 is a schematic diagram one showing a resource sub-block division when the DL reference resource is 2 slots in this implementation mode. As shown in FIG. 6, a first slot is divided into 6 resource sub-blocks by using a granularity {5-5-4 OS, ½ BW}, and a second slot is divided into 8 resource sub-blocks by using a granularity {4-3-4-3 OS, ½ BW}.

In a scenario two, uplink symbols are included in the slots, and two slots have a same format, that is, in this case, the number of uplink symbols included in each slot is the same. In this case, after uplink symbols are removed from two slots, the DL reference resource has 2N symbols, that is, each slot has N symbols. In this case, when the DL reference resource is divided into resource sub-blocks, one of following manners may be used: a manner 1, a manner 2, a manner 3 or a manner 4.

In the manner 1, the DL reference resource is divided into 14 resource sub-blocks, and each slot contains 2 resource sub-blocks. In this case, the N symbols in each slot may be divided into 7 shares, and the frequency domain is divided into 1 share by using the granularity of 1 BW; or the time domain is divided into 1 share, and the frequency domain is divided into 7 shares; or the time domain is divided into 2 shares, the frequency domain a first share is divided into 3 shares, and the frequency domain a second share is divided into 4 shares; and so on. The granularity used is not unique in this case.

In the manner 2, the downlink reference resource is divided into 14 resource sub-blocks, where a difference of numbers of resource sub-blocks included in each slot is not more than 2. In this case, the N symbols included in each of the two slots are divided into 7 shares and 7 shares, or 6 shares and 8 shares respectively. For example, when N=8, the time domain of the first slot is divided into 8 shares using the granularity of 1 OS, the frequency domain is divided into 1 share using a granularity of 1 BW, the time domain of the second slot is divided into 6 shares using a mixed granularity of 1 OS and 2 OS, and the frequency domain is divided into 1 share using a granularity of 1 BW.

Figure 7:
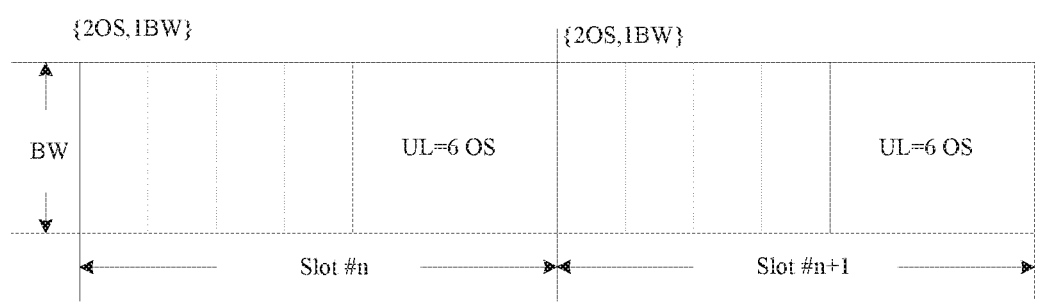
FIG. 7 is a schematic diagram two showing a resource sub-block division when a downlink reference resource is 2 slots according to an implementation mode.
Figure 8:
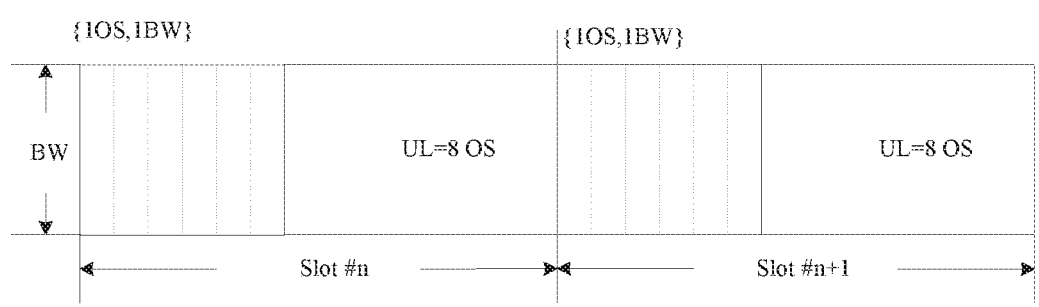
FIG. 8 is a schematic diagram three showing a resource sub-block division when a downlink reference resource is 2 slots according to an implementation mode.

In the manner 3, the DL reference resource is divided into less than or equal to 14 resource sub-blocks, two slots are divided only according to granularities {1 OS, 1 BW} and/or {2 OS, 1 BW}, and when there are less than 14 resource sub-blocks, a remaining PI indicates that bits are reserved and not used. For example, when the number of uplink symbols is less than 7 and is an even number, a granularity of 2 OS is used. FIG. 7 is a schematic diagram two showing a resource sub-block division when the DL reference resource is 2 slots in this implementation mode. As shown in FIG. 7, when the number of uplink symbols is less than 7 and is an odd number, a mixed granularity of 2 OS and 1 OS is used; when the number of uplink symbols is greater than 7, a granularity of 1 OS is used, and FIG. 8 is a schematic diagram three showing a resource sub-block division when the DL reference resource is 2 slots in this implementation mode, as shown in FIG. 8.

In the manner 4, a total of 28 symbols of two slots including uplink symbols are divided into 14 resource sub-blocks by {M, N}={14, 1} or {7, 2}, and when resources in a resource sub-block are completely uplink resources, it is indicated that bits of the resource sub-block are not used or just reserved. In this case, the division manner is the same as manners in the scenario one.

In a scenario three, uplink symbols are included in the slots, and formats of two slots are different, that is, in this case, the number of uplink symbols included in each slot is different. In this case, after uplink symbols are removed from two slots, the DL reference resource has N1 and N2 symbols in two slots respectively. In this case, when the DL reference resource is divided into resource sub-blocks, one of following manners may be used: a manner 1, a manner 2 or a manner 3.

In the manner 1, the DL reference resource is divided into 14 resource sub-blocks. Numbers of resource sub-blocks included in the two slots are allocated according to a ratio of N1 to N2, that is, the number of sub-blocks in a respective one of two slots is divided according to the ratio of N1 to N2, and a sum of these two numbers is 14. Alt.1 when the ratio meets 3:4, the DL reference resource may be divided by {14, 1} or {7, 2}; alt. 2 when ratio does not meet 3:4, the DL reference resource may be divided only by {14, 1}. When one DL reference resource is divided into resource sub-blocks, at least one time-frequency domain granularity is used.

In the manner 2, the DL reference resource is divided into less than or equal to 14 resource sub-blocks, that is, the number of sub-blocks in a respective one of two slots is divided according to the ratio of N1 to N2, and a sum of these two numbers is not more than 14. When one DL reference resource is divided into resource sub-blocks, only one time-frequency domain granularity is used.

In the manner 3, a total of 28 symbols of two slots including uplink symbols are divided into 14 resource sub-blocks by {M, N}={14, 1} or {7, 2}, and when resources in a resource sub-block are completely uplink resources, it is indicated that bits of the resource sub-block are not used or just reserved. In this case, the division manner is the same as manners in the scenario one. Through the resource indication method in this implementation mode, resource indication applicable to a case in which the number of symbols of the DL reference resource is greater than 1 under the condition of fixed indication overhead, so that data of preempted transmission can know the position of the preemption resource, the accumulation and spread of a large amount of retransmission data and error data are avoided, only the preempted resource is transmitted, and the spectrum efficiency of the system is improved.

Implementation Mode Three

Resources used by a base station to transmit a URLLC traffic with a short transmission duration are resources which are preempted from resources already allocated to an eMBB traffic. A terminal whose resources are preempted is notified which resources in a configured DL reference resource region are preempted via preemption indication information.

A frequency domain region corresponding to the DL reference resource region is an activation DL BWP of the terminal, and a corresponding time domain region may be configured, which may be an integer multiple of slots or may be several OFDM symbols.

The time domain region corresponding to the DL reference resource region of this implementation mode is more than two slots, such as 5, 10 or 20 slots.

For a scenario of more than 2 slots, a principle to be followed during the division of resource sub-blocks is that the number of divided resource sub-blocks are not greater than 14. When the number of resource sub-blocks is less than 14, the remaining indicates that bits are not used or just reserved. In this case, the DL reference resource is divided by a larger granularity.

For example, when DL reference resource=5 slots, each slot is divided into 2 sub-blocks, that is, there are a total of 10 sub-blocks. Preferably, in each slot, the time domain is divided into two portions in half, or the frequency domain is divided into two portions in half.

When DL reference resource=10 slots, each slot is regarded as 1 sub-block, that is, there are a total of 10 sub-blocks.

When DL reference resource=20 slots, every two slots are regarded as 1 sub-block, that is, there are a total of 10 sub-blocks.

Through the resource indication method in this implementation mode, resource indication applicable to a case in which the number of symbols of the DL reference resource is greater than 1 under the condition of fixed indication overhead, so that data of preempted transmission can know the position of the preemption resource, the accumulation and spread of a large amount of retransmission data and error data are avoided, only the preempted resource is transmitted, and the spectrum efficiency of the system is improved.

Based on any one of the foregoing implementation modes one, two or three, the manner of determining the time domain region of the DL reference resource is equal to a monitoring period of the DL control information bearing the preemption indication, and the determination of the monitoring period of the DL control information bearing the preemption indication includes at least one of the following: a manner one, a manner two or a manner three.

In the manner one, the monitoring period is configured via high layer signaling or physical layer signaling, and is not related to a monitoring period of DL control information bearing slot format information (SFI).

In the manner two, the monitoring period is configured via high layer signaling or physical layer signaling, and the monitoring period of the DL control information bearing the preemption indication is less than or equal to a monitoring period of DL control information bearing SFI.

For example, when the monitoring period of DL control information bearing SFI is 2 slots, the monitoring period of the DL control information bearing the preemption indication may be 1 slot or 2 slots.

In the manner three, the monitoring period is configured via high layer signaling or physical layer signaling, and the monitoring period of the DL control information bearing the preemption indication is a sub-set of a monitoring period of DL control information bearing SFI. For example, when the monitoring period of DL control information bearing SFI is 1, 2, 5, 10 or 20 slots, the monitoring period of the DL control information bearing the preemption indication may be 1, 2 or 5 slots.

Through the frequency domain resource configuration described in this implementation mode, that the format of each slot is the same when the DL reference resource contains multiple slots can be achieved, unequal division of DL symbols is avoided, uniform DL reference resources are used when transmission is preempted, and the processing complexity of the base station or the terminal is reduced.

Through this implementation mode, when the traffics with different transmission time in the communication system are transmitted, the resource transmission of the traffic with longer transmission time is preempted by the traffic with shorter transmission time, so that the problem of how to determine the resource preemption indication is solved.

Embodiment Four

After the terminal receives a preemption indication information, the buffer is flushed in one of following: a manner one, a manner two, a manner three, a manner four, a manner five or a manner six.

In the manner one, in the case in which only a preemption indication (PI) is received, the buffer is flushed according to a resource indicated by the PI.

In the manner two, in the case in which only a preemption indication (PI) is received, the buffer is flushed according to a code block group (CBG) corresponding to a resource indicated by the PI. Preferably, the CBG containing the preempted indication resource needs to refresh the buffer.

In the manner three, when the PI and a CBG flush indication (CBGFI, indicating whether to flush the buffer on resources corresponding to all CBGs) are received at the same time, the buffer is flushed according to the resource indicated by the PI. The specific manner of flushing the buffer is preferably the manner one or two, but it is not limited hereto.

In the manner four, when the PI and the CBGFI are received at the same time, the buffer is flushed according to the CBGFI indication. The buffer is flushed on resources corresponding to all CBGs.

In the manner five, when the PI and the CBGFI are received at the same time, when the CBGFI indicates not to flush the buffer, the buffer is flushed according to the resource indicated by the PI, and the specific manner of flushing the buffer is preferably, but is not limited to, the manner one or two; and when the CBGFI indicates to flush the buffer, the buffer is flushed according to the CBGFI indication, and preferably the buffer is flushed on resources corresponding to all CBGs.

In the manner six, when the PI and the CBGFI are received at the same time, when the CBGFI indicates not to flush the buffer, the buffer is not flushed; and when the CBGFI indicates to flush the buffer, the buffer is flushed according to the resource indicated by the PI, and the specific manner of flushing the buffer is preferably, but is not limited to, the manner one or two.

The manner three, four, five and six are also applicable to the scenario in which the PI is received earlier than the CBGFI, or the scenario in which the CBGFI is received earlier than the PI.

Through the buffer flushing method described in this embodiment, the problem of how the terminal flushing the buffer according to the PI or the problem of how to flush the buffer according to both the PI and the CBGFI can be solved.

Embodiment Five

The embodiments of the present invention further include a storage medium. The storage medium includes stored programs which, when executed, perform the method of any of the embodiments of the present invention.

Optionally, in this embodiment, the storage medium may be configured to store program codes for executing steps S1 and S2.

In S1, a reference resource for preemption transmission is configured, the reference resource is divided into M portions in a time domain, and the reference source is divided into N portions in a frequency domain.

In S2, a preempted resource is indicated in the M time domain portions and/or N frequency domain portions by means of indication information, where $M \geq 1$, $N \geq 1$, and the number of downlink symbols included in the time domain of the reference resource includes at least one of: a number less than 14 or a number greater than 14.

Optionally, in this embodiment, the storage medium may include, but is not limited to, a USB flash disk, a Read-Only Memory (ROM), a Random Access Memory (RAM), a mobile hard disk, a magnetic disk, an optical disk or another medium capable of storing the program codes.

The embodiments of the present invention further provide a processor. The processor is configured to execute programs which, when executed, perform steps of the method of any of the embodiments of the present invention.

Optionally, in this embodiment, the programs are used for executing steps S1 and S2.

In S1, a reference resource for preemption transmission is configured, the reference resource is divided into M portions in a time domain, and the reference source is divided into N portions in a frequency domain.

In S2, a preempted resource is indicated in the M time domain portions and/or N frequency domain portions through indication information, where $M \geq 1$, $N \geq 1$, and the number of downlink symbols included in the time domain of the reference resource includes at least one of: a number less than 14 or a number greater than 14.

Optionally, for specific examples in this embodiment, reference may be made to examples described in the above embodiment and exemplary embodiments, and what has been described will not be repeated herein.

Apparently, it should be understood by those skilled in the art that each of the above-mentioned modules or steps of the present invention may be implemented by a general-purpose computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present invention is not limited to any specific combination of hardware and software.

The above are only preferred embodiments of the present invention and not intended to limit the present invention, and for those skilled in the art, the present invention may have various modifications and variations. Any modifications, equivalent substitutions, improvements and the like made within the principle of the present invention should fall within the scope of the present invention.

What is claimed is:

1. A resource indication method, comprising:
configuring a reference resource for preemption transmission, dividing a time domain region of the reference resource into M time domain portions, and dividing a frequency domain region of the reference source into N frequency domain portions; and
indicating a preempted resource in the M time domain portions and/or N frequency domain portions through indication information, wherein M≥1, and N≥1;
wherein a number of downlink symbols comprised in the time domain region of the reference resource is less than 14.

2. The method of claim 1, wherein the time domain region of the reference resource is one slot and excluding uplink symbols.

3. The method of claim 2, further comprising: dividing the reference resource by adopting at least one time domain granularity and at least one frequency domain granularity to obtain Y resource sub-blocks, wherein resources comprised in each of the divided resource sub-blocks do not have a same size, wherein Y is a positive integer.

4. The method of claim 3, wherein Y=14.

5. The method of claim 2, further comprising: dividing the reference resource by using one time domain granularity and one frequency domain granularity to obtain less than or equal to Y resource sub-blocks, wherein the divided resource sub-blocks have a same size, and the one time domain granularity and the one frequency domain granularity are fixed values or indicated through signaling, wherein Y is a positive integer.

6. The method of claim 5, wherein the dividing the reference resource by using the one time domain granularity and the one frequency domain granularity comprises at least one of:
dividing the reference resource by selecting different candidate granularity sets according to whether a number of symbols comprised in the reference resource is an even number or an odd number;
dividing the reference resource by selecting different candidate granularity sets according to whether the number of symbols comprised in the reference resource is greater than 7;
dividing the reference resource by selecting different candidate granularity sets according to whether the number of symbols comprised in the reference resource is an even number or an odd number and whether the number of symbols comprised in the reference resource is greater than 7; or
dividing fourteen symbols of the reference resource comprising uplink symbols, and in condition that resources in a divided resource sub-block are completely uplink resources, indicating that bits of the resource sub-block are not used or reserved.

7. The method of claim 6, wherein each of the candidate granularit ysets comprises at least one of: {1 OS, 1 BW}, {2OS, ½ BW}, or {1 OS, ½ BW}; wherein OS denotes an orthogonal frequency division multiplexing symbol, and BW denotes an activation bandwidth part (BWP).

8. The method of claim 2, wherein different candidate granularities are determined to be used to divide the reference resource to obtain resource sub-blocks according to whether the number x of symbols comprised in the reference resource is greater than P, wherein P is a positive integer and a 1/P bandwidth is a division granularity in a frequency domain.

9. The method of claim 8, wherein in condition that 0<x≤7, dividing the x symbols by using a granularity {1 OS, ½ BW} with 1 symbol in a time domain and ½ BWP in a frequency domain to obtain less than or equal to Y resource sub-blocks, wherein resources comprised in each of the divided resource sub-blocks have a same size; and in condition that 7<x≤14, diving (14−x) symbols by using a granularity {1 OS, ½ BW}, and diving (2x−14) symbols by using a granularity {1 OS, 1 BW} with 1 symbol in the time domain and one BWP in the frequency domain to obtain Y resource sub-blocks, wherein resources in each of the divided resource sub-blocks do not have a same size, wherein Y is a positive integer.

10. The method of claim 1, wherein the time domain region of the reference resource is at least one of:
two slots and comprising uplink symbols; or
two slots and not comprising uplink symbols.

11. The method of claim 10, wherein a division manner of the reference resource comprises at least one of:
in condition that the uplink symbols are not comprised in the slots and divided resource sub-blocks are allowed to cross a slot boundary, dividing the reference resource by configuring {M, N}={14, 1} or {7, 2} to obtain 14 resource sub-blocks, wherein division granularities corresponding to {M, N}={14, 1} and {M, N}={7, 2} are {2 OS, 1 BW} and {4 OS, ½ BW} respectively; wherein {2 OS, 1 BW} is a granularity with two symbols in the time domain and one BWP in the frequency domain, and {4 OS, ½ BW} is a granularity with four symbols in the time domain and ½ BWP in the frequency domain;
in condition that the uplink symbols are not comprised in the slots and the divided resource sub-blocks are not allowed to cross the slot boundary, dividing the reference resource with a granularity {2 OS, 1 BW} by configuring {M, N}={14, 1} to obtain 14 resource sub-blocks; or
in condition that the uplink symbols are not comprised in the slots and the divided resource sub-blocks are not allowed to cross the slot boundary, dividing the reference resource by configuring {M, N}={14, 1} and {7, 2} to obtain 14 resource sub-blocks, wherein different numbers of resource sub-blocks in two slots are divided through {M, N}={7, 2} respectively.

12. The method of claim 10, wherein a division manner of the reference resource comprises at least one of:
in condition that the uplink symbols are comprised in the slots and the two slots have a same format, dividing the reference resource into Y resource sub-blocks, wherein 7 resource sub-blocks are comprised in each of the two slots;
in condition that the uplink symbols are comprised in the slots and the two slots have a same format, dividing the reference resource into Y resource sub-blocks, wherein a number of resource sub-blocks comprised in each of the two slots is different, the difference between two of numbers of the resource sub-blocks is not greater than 2;
in condition that the uplink symbols are comprised in the slots and the two slots have a same format, dividing, by the two slots, the reference resource according to division granularities {1 OS, 1 BW} and/or {2 OS, 1 BW} to obtain less than or equal to Y resource sub-blocks; or in condition that the uplink symbols are comprised in the slots and the two slots have a same format, dividing the reference resource comprising 28 symbols of the two slots comprising uplink symbols to obtain Y resource sub-blocks, and when resources in a resource sub-block are completely uplink resources, indicating that bits of the resource sub-block are not used or reserved.

13. The method of claim 10, wherein the division manner of the reference resource comprises at least one of:

in condition that the uplink symbols are comprised in the slots and formats of the two slots are different, allocating numbers of resource sub-blocks comprised in the two slots according to a ratio of N1 to N2 by using at least one time-frequency domain division granularity in one reference resource to obtain Y resource sub-blocks;

in condition that the uplink symbols are comprised in the slots and formats of the two slots are different, when one reference resource is divided into resource sub-blocks, allocating numbers of resource sub-blocks in respective slots according to a ratio of N1 to N2 by using only one time-frequency domain granularity to obtain less than or equal to Y resource sub-blocks; or in condition that the uplink symbols are comprised in the slots and the two slots have a same format, dividing 28 symbols of the two slots comprising uplink symbols into Y resource sub-blocks, and in condition that resources in a resource sub-block are completely uplink resources, indicating that bits of the resource sub-block are not used or reserved;

wherein the reference resource has N1 and N2 symbols in the two slots respectively, wherein Y is a positive integer.

14. The method of claim 1, wherein the time domain region of the reference resource is at least one of:

more than two slots and comprising uplink symbols; or more than two slots and not comprising uplink symbols.

15. The method of claim 14, wherein a division manner of the reference resource comprises at least one of:

dividing the reference resource into less than or equal to Y resource sub-blocks, wherein Y is a positive integer.

16. The method of claim 15, further comprising at least one of:

in condition that a number of resource sub-blocks is less than 14, indicating that bits of remaining resource sub-blocks are not used or reserved;

in condition that the number of resource sub-blocks is less than or equal to 14, when resources in a resource sub-block are completely uplink resources, indicating that bits of the resource sub-block are not used or reserved.

17. A resource indication method, comprising:

flushing a buffer after a user equipment (UE) receives indication information;

wherein the flushing the buffer comprises at least one of:

in response to receiving indication information and designated information, flushing the buffer according to a resource indicated by the indication information;

in response to receiving indication information and designated information, flushing the buffer according to an indication of the designated information;

in response to receiving indication information and designated information are received, in condition that the designated information indicates not to flush the buffer, flushing the buffer according to a resource indicated by indication information PI; and when the designated information indicates to flush the buffer, flushing the buffer according to an indication of the designated information; or in response to receiving indication information and designated information, in condition that the designated information indicates not to flush the buffer, not flushing the buffer; and in condition that the designated information indicates to flush the buffer, flushing the buffer according to a resource indicated by the indication information, wherein the designated information is used for indicating whether to flush the buffer on resources corresponding to all code block groups (CBGs), and the indication information is used for indicating a preempted resource in M time domain portions and/or N frequency domain portions, wherein the M time domain portions are obtained by dividing a reference resource into M portions in a time domain, and the N frequency domain portions are obtained by dividing the reference resource into N portions in a frequency domain.

18. A resource indication device, comprising:

a processor; and a memory for storing instructions executable by the processor, wherein the processor is configured to:

configure a reference resource for preemption transmission, divide a time domain region of the reference resource into M time domain portions, and divide a frequency domain region of the reference source into N frequency domain portions; and indicate a preempted resource in the M time domain portions and/or N frequency domain portions through indication information, wherein M≥1, and N≥1, and wherein a number of downlink symbols comprised in the time domain region of the reference resource is less than 14.

19. A non-transitory storage medium, comprising stored programs which, when executed, perform the method of claim 1.

20. A processor, which is configured to execute programs which, when executed, perform the method of claim 1.

* * * * *

UNITED STATES PATENT AND TRADEMARK OFFICE
CERTIFICATE OF CORRECTION

PATENT NO. : 11,375,502 B2
APPLICATION NO. : 16/764570
DATED : June 28, 2022
INVENTOR(S) : Jing Shi et al.

It is certified that error appears in the above-identified patent and that said Letters Patent is hereby corrected as shown below:

In the Specification

Column 6, Line 45, delete "reserved" and insert -- reserved. --.

In the Claims

Column 21, Line 61, Claim 7, delete "granularit ystes" and insert -- granularity sets --.

Column 21, Line 62, Claim 7, delete "{2OS," and insert -- {2 OS, --.

Signed and Sealed this
Nineteenth Day of November, 2024

Katherine Kelly Vidal
*Director of the United States Patent and Trademark Office*